No. 694,807. Patented Mar. 4, 1902.
R. B. VANDERBURG.
SAUCEPAN.
(Application filed May 27, 1901.)
(No Model.)
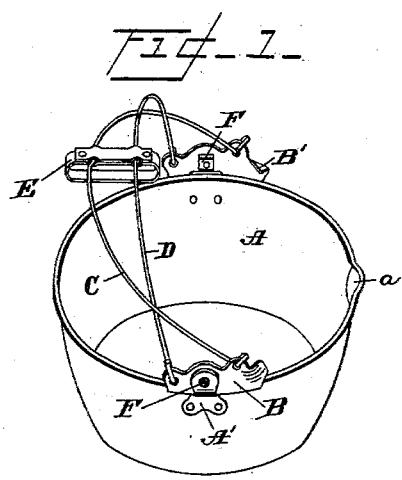
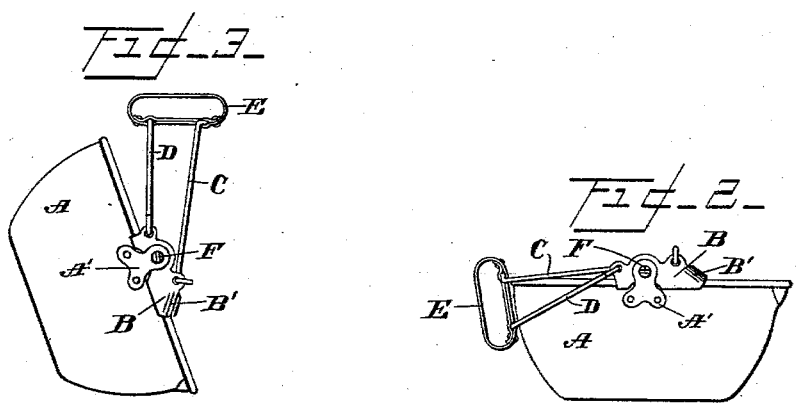
WITNESSES
Chas. L. Hyde.
Mattie McGinnis
INVENTOR
Robert B Vanderburg
BY HIS ATTORNEYS
Hazard & Marsham

UNITED STATES PATENT OFFICE.

ROBERT B. VANDERBURG, OF LOS ANGELES, CALIFORNIA, ASSIGNOR OF ONE-HALF TO ANDREW W. JOHNSON, OF LONGBEACH, CALIFORNIA.

SAUCEPAN.

SPECIFICATION forming part of Letters Patent No. 694,807, dated March 4, 1902.

Application filed May 27, 1901. Serial No. 62,145. (No model.)

*To all whom it may concern:*

Be it known that I, ROBERT B. VANDERBURG, a citizen of the United States, residing at Los Angeles, in the county of Los Angeles and State of California, have invented new and useful Improvements in Saucepans, of which the following is a specification.

My invention is an improvement on the patent granted to me on August 25, 1895, No. 545,183, for saucepans. Under that patent it is necessary that the saucepan be manufactured with the improvement therein described as a part thereof.

The objects of my present invention are to adapt my improvement for use to any saucepan or kettle of ordinary manufacture, to cause the pan or vessel to tilt and discharge its contents, and also to provide means to retain the cover on the vessel while the contents are being discharged. I accomplish these objects by the device described herein and illustrated in the accompanying drawings, in which—

Figure 1 is a perspective view of an ordinary saucepan with my improvement attached thereto, with its bails crossed to hold them in an upright position. Fig. 2 is a side view with the bails folded, so as to permit nesting of the saucepans for storage and transportation. Fig. 3 is a side view as the parts appear during the act of pouring out the contents of the vessel.

In the drawings, A is the vessel, of any suitable size and material, with a pouring mouth or lip $a$ and provided with the ordinary ears A'.

B B are the twin bail-ears, to which are pivotally connected the lower ends of bails C and D. The bail C is somewhat longer than the bail D, to which it is pivotally connected at its middle portion by a hand gripping-bar E, which is preferably connected to the bails in the manner described in my said Patent No. 545,183. Said bar, however, may be connected to said bails in any suitable manner. Intermediate the pivotal connections of the bails with the ears is a hole for the passage therethrough of a bolt F, which unites the bail-ears to the ordinary ears of the vessel, and thereby enables me to attach my improved bails and ears to any vessel of ordinary manufacture which is provided with bail-ears of ordinary construction. The bail-ears are provided on their front end—that is, the nearest end to the pouring-mouth—with inwardly-projecting points or lugs B', which are adapted to project over a cover when placed on the vessel and prevent it from falling off when said vessel is being emptied of its contents.

Having described my invention, what I claim as new, and desire to secure by Letters Patent, is—

As a new article of manufacture, a detachable bail for kettles comprising a pair of twin bail-ears having a bail-receiving hole near each end of each ear; two bails in said bail-holes; one of which is shorter than the other; and a hand gripping-bar centrally mounted on said bails.

In witness that I claim the foregoing I have hereunto subscribed my name this 16th day of May, 1901.

ROBERT B. VANDERBURG.

Witnesses:
 HENRY T. HAZARD,
 G. E. HARPHAM.